United States Patent [19]

Rosman

[11] Patent Number: 4,749,097
[45] Date of Patent: Jun. 7, 1988

[54] TWO SECTION BAKERY CONTAINER

[76] Inventor: Morris Rosman, 1104 Lockwood, Buffalo Grove, Ill. 60089

[21] Appl. No.: 82,791

[22] Filed: Aug. 6, 1987

Related U.S. Application Data

[62] Division of Ser. No. 840,209, Mar. 17, 1986, Pat. No. 4,683,703.

[51] Int. Cl.⁴ .............................................. B65D 5/32
[52] U.S. Cl. ........................................ 220/4 B; 220/8; 220/DIG. 25; 229/3.5 MF; 229/23 R; 229/23 BT; 229/122; 229/906
[58] Field of Search ................ 220/4 B, 8, DIG. 25; 229/3.5 MF, 23 R, 23 BT, 906, 122; 206/555, 449

[56] References Cited

U.S. PATENT DOCUMENTS

| 2,675,123 | 4/1954 | Baird | 229/23 BT |
| 2,925,933 | 2/1960 | Watson | 229/3.5 MF |
| 2,948,624 | 8/1960 | Watson | 220/8 |
| 2,960,255 | 11/1960 | Blone | 229/3.5 MF |
| 3,134,499 | 5/1964 | Johnson | 220/8 |
| 3,142,413 | 7/1964 | Grogel | 229/2.5 MF |

FOREIGN PATENT DOCUMENTS

| 128918 | 8/1948 | Australia | 220/8 |

Primary Examiner—George E. Lowrance

[57] ABSTRACT

A thin-walled easily opened container and method of making the same for commercial food products that includes congruent mating and overlapping sections crimped over a cover panel.

5 Claims, 3 Drawing Sheets

TWO SECTION BAKERY CONTAINER

RELATED APPLICATION

This application is a division of the United States patent application, Ser. No. 840,209, filed Mar. 17, 1986, U.S. Pat. No. 4,683,703, issued Aug. 4, 1987, entitled "METHOD OF MAKING A TWO SECTION BAKERY CONTAINER".

BACKGROUND OF THE INVENTION

Low-cost disposable packaging containers have been designed and produced for commercial foodstuffs, such as various bakery goods, for the last several decades. Frequently these containers take the form of circular or rectangular containers constructed of thin-walled aluminum sheeting having wall thicknesses on the order of 0.004 to 0.010 inches, which means that the sheeting material itself is flexible. Usually these containers are drawn from flat sheeting to form upstanding side walls from a bottom wall along with shoulders to receive a cover panel.

The flexibility in the sheeting material results mainly from a desire to construct the container of a low-cost disposable material. To increase the structural integrity of the container manufactured from this material, the container drawing tool or die is designed to form a plurality of ribs in the container side walls and also to form a shoulder surrounding the upper edge of the side wall.

In some cases the side walls are formed with a vertical lip which is subsequently crimped over a cover panel.

One problem found in these thin-walled disposable containers is that it is difficult to remove certain types of foodstuffs, such as bakery goods, that are conventionally baked within the container itself. In cases where the container is pre-filled with bakery goods engaging both the bottom and the side walls, such as pound cakes or coffee cakes, it is difficult to remove the cake from the container as a whole or to remove one or more initial slices from one end of the container in the case of rectangular containers or the first slice in the case of a circular type container.

There have been attempts to facilitate the removal of bakery goods from reusable containers. However, insofar as Applicant is aware, there has been no application of these techniques nor any other techniques to solve the removal problem in the disposable container field for commercially produced bakery goods.

Several United States patents disclose reusable homemaker-type containers designed to facilitate the removal of bakery goods from baking containers. One such container shown in the Corse U.S. Pat. No. 4,113,225 shows a rectangular baking pan that has a removable side wall that permits insertion of a spatula under the baked goods and allows access to the bottom of the baked goods so that the product may be separated from the pan for ease in removing the product, and more particularly to permit a spatula to separate the baked goods product from the bottom of the pan. There are two deficiencies in the Corse baking pan: firstly, Corse has only a portion of the end panel removable so that a lip actually interferes with spatula insertion, and secondly, the removable section does not have wrap-around corners and does not fit on the outside of his main section to facilitate removal of the smaller end section to minimize product damage.

There are several other patents that show removable wall sections on a baking pan such as the Peacock U.S. Pat. No. 493,835 and the Sinclair U.S. Pat. No. 1,497,033 but these are primarily designed to facilitate removal of the entire product from the container rather than to provide easier slicing of the product while the remaining portion remains in the container. In these containers only a flat end wall is removable essentially from inside a main baking pan.

Also U.S. Pat. Nos. the Grant 701,198; the Wells 1,223,226; the Kratz 1,714,379; and the Paek U.S. Pat. No. 4,266,668 show other baking containers having removable side wall portions.

It is a primary object of the present invention to provide a disposable low-cost container for commercial bakery goods that is easily opened to provide access to the enclosed bakery goods.

SUMMARY OF THE PRESENT INVENTION

According to the present invention, an easily openable low-cost container is provided for commercial foodstuffs, particularly bakery goods, and a method of making the same, that consists of two overlapping congruent sections preferably constructed of thin aluminum sheeting provided with ribs and crimping lips in the overlapping areas of the sections to not only increase the strength of the container but to assist in holding the two sections together.

The crimping lips on the first and second sections are designed to clamp over a conventional cover panel that not only strengthens the container but also assists in holding the two sections together.

An important aspect of the present invention is its simple method of manufacturing that begins with two webs of identical aluminum sheeting fed in partly overlapping engagement with one another after the application of a contact adhesive such as one of the contact adhesives manufactured by 3M Corporation of Minneapolis, Minn., to the overlapping area on one or both of the web sheets prior to engagement with the other.

The mated webs are pressed together with pressing rollers and fed to container-forming mating die rollers that shape the entire container in a single metal drawing operation. The composite web is fed to the container forming die to position the overlapped area near one end of the container so that upon user removal of the short section of the container, a major portion of the bakery goods will remain enclosed by the other container section.

The die rollers cut and sever the containers from the web and form the two-section container with a horizontal shoulder at the upper end of its walls bending up into a vertical lip that is crimped over the cover panel after the container is filled and baked.

Applicant has provided according to the present invention a disposable container at a cost only very slightly higher than presently known disposable containers and at the same time has designed a container that is easily opened by the user to facilitate the initial removal of bakery goods from the container. Furthermore the removed section of the container can be easily re-crimped onto the larger section for storage after partial removal of the bakery goods.

DETAILED DESCRIPTION OF THE PREFERRED EMBODIMENTS

Figure 1:
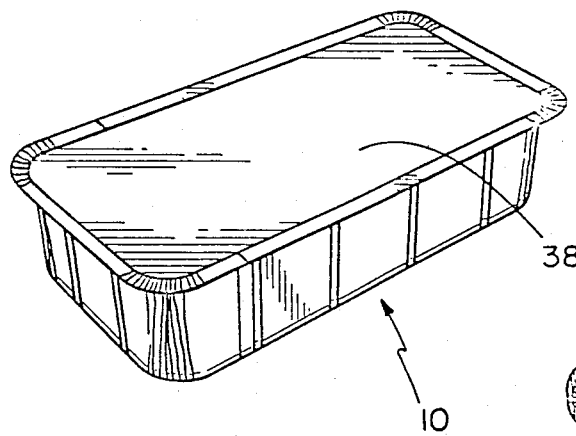
FIG. 1 is a perspective view of an exemplary rectangular disposable container according to the present invention.
Figure 2:
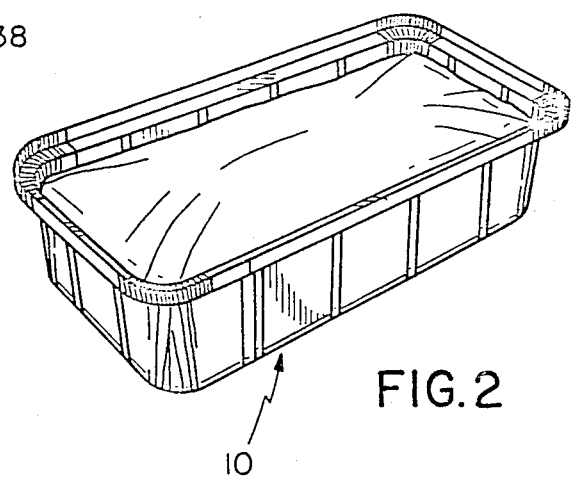
FIG. 2 is a perspective view similar to FIG. 1 of the container according to the present invention prior to application of a cover panel.

Referring to the drawings and particularly to FIGS. 1 to 5, a container assembly 10 is illustrated according to the present invention and is seen in these figures as a generally rectangular container consisting of a rectangular bottom wall 11 with upstanding side walls 12 and end walls 13 and 15. The container 10 is constructed from aluminum sheet material having a thickness between 0.004 and 0.010 inches so that container 10 is constructed of flexible sheet material reinforced by its own configuration as will appear hereinbelow.

Figure 3:
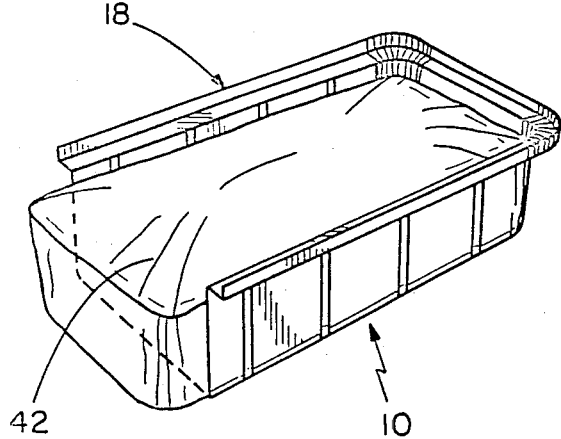
FIG. 3 is a perspective view similar to FIG. 2 with the short container section removed.
Figure 5:
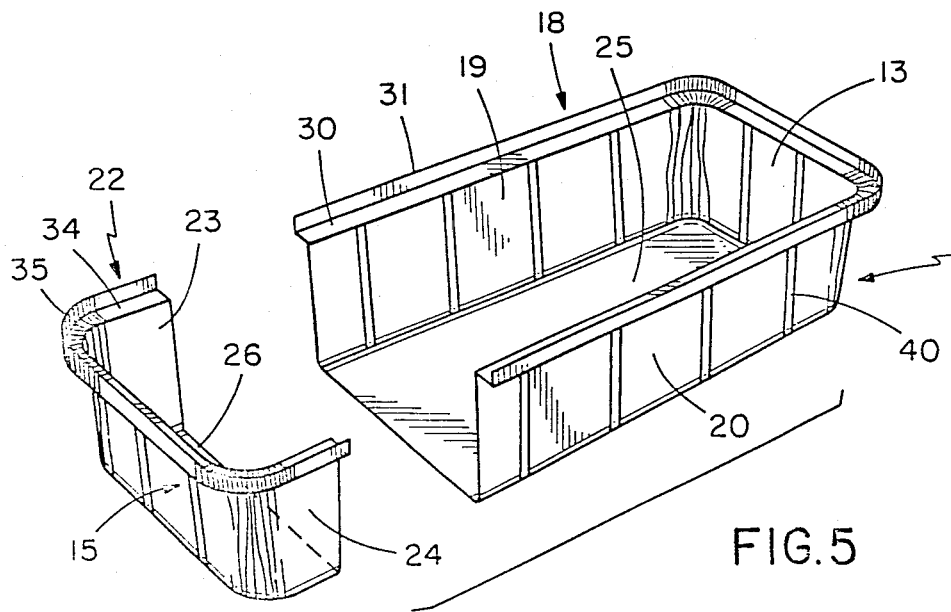
FIG. 5 is an exploded perspective view similar to FIG. 4 with the two container sections spaced from one another.

The container 10 as seen more clearly in FIGS. 3 and 5 is constructed of a first enlarged section 18, having a bottom wall 25, a side wall portion 19, end wall 13 and a side wall portion 20, and a second smaller section 22 including bottom wall 26, side wall portions 23 and 24 and end wall 15.

Section 18 has a peripheral horizontal integral shoulder 30 and a vertical lip portion 31 together surrounding side walls 19 and 20 and end wall 13, while second section 22 has a peripheral horizontal shoulder 34 and a vertical lip 35 surrounding and integral with side walls 23 and 24 and end wall 15.

Figure 6:
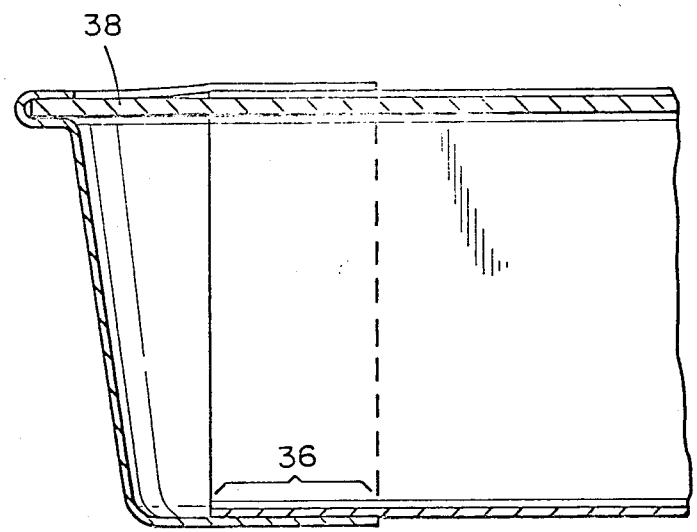
FIG. 6 is an enlarged longitudinal fragmentary section of the removable end of the container taken generally along line 6—6 of FIG. 4.
Figure 7:
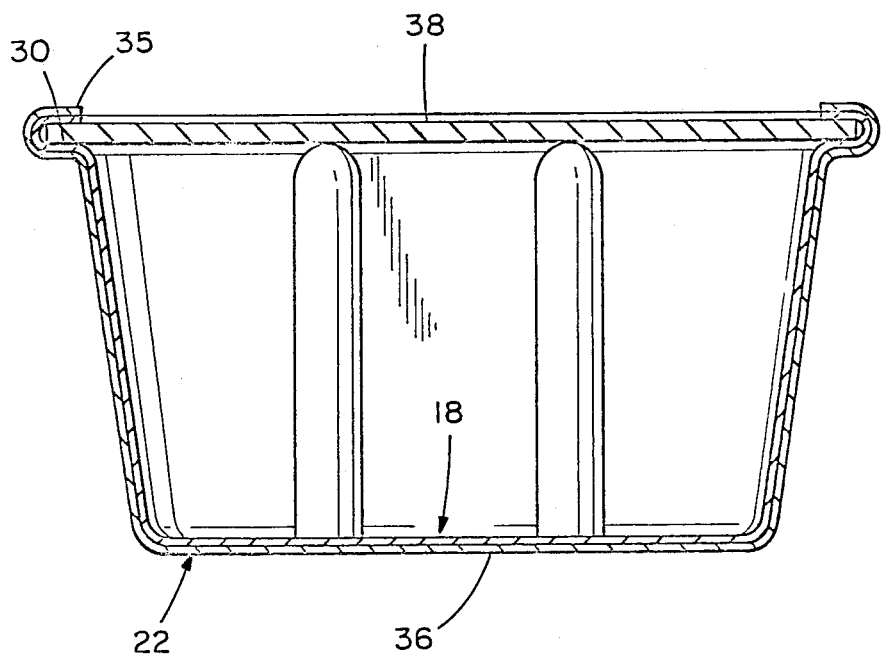
FIG. 7 is an enlarged cross-section of the container with the cover in position taken generally along line 7—7 of FIG. 4.
Figure 8:
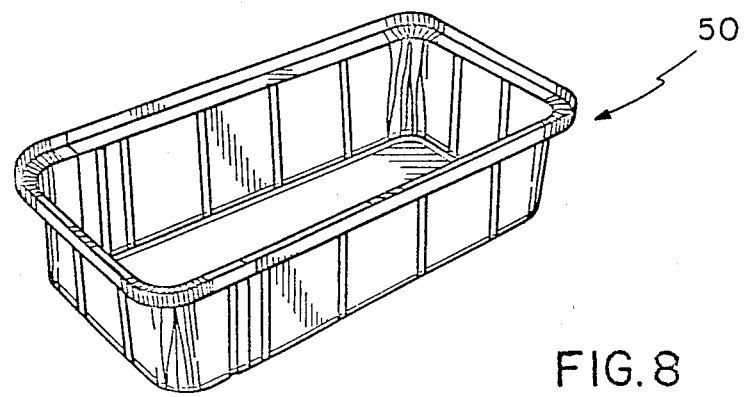
FIG. 8 is a perspective view similar to FIG. 4 of a modified form of the present invention with additional supporting ribs.

The shorter section 22 fits over and overlaps main section 18 as seen in FIGS. 6 and 7 in an overlap area designated 36 in FIGS. 6 and 7. The overlap area 36 preferably has a suitable releasable contact adhesive between the sections to assist in holding them together.

As seen in FIGS. 1, 6 and 7 a cover panel 38 rests on shoulders 30 and 34 on the mating sections 18 and 22 and the lip portions 31 and 35 are crimped over cover 38 to hold and seal the cover in position. An important aspect of the present invention is that the crimped lip portions 31 and 35 and shoulders 30 and 34 not only hold the cover in position, but the composite structure of the cover 38 and the container sections 18 and 22 assists in holding the sections 18 and 22 together as an integral unit.

Sections 18 and 22 contain a plurality of vertical ribs 40 that are deformations in the sheeting material having arcuate but uniform wall thickness sections as will appear to those with skill in this art.

Figure 4:
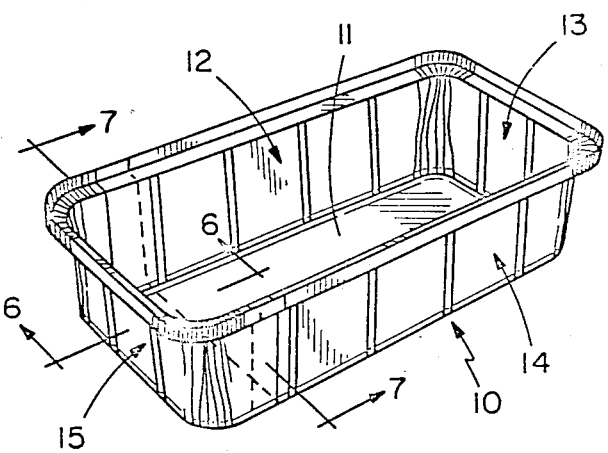
FIG. 4 is a perspective view similar to FIG. 2 prior to filling with any bakery goods.

The container 10 illustrated in FIGS. 1 to 8 is initially assembled into the configuration shown in FIG. 4 and in that state is filled with uncooked bakery goods and the goods are then baked in situ in the container and thereafter the cover is placed over the container on shoulders 30 and 34 and then the lip portions 31 and 35 are crimped over to the position illustrated in FIG. 7 holding the cover in position.

After purchase the user bends the lip portions 31 and 35 away from the cover, the container section 22 is grasped and pulled away from container section 18, exposing the baked goods 42 as seen in FIG. 3 with a portion of the goods projecting from the open end of container section 18, and permitting the user to easily slice away the cantilevered end of the baked goods as desired without damaging the baked goods in any way. After a portion of the baked goods is sliced away the user may, if desired, replace the removed section 22 by crimping the lip 35 over lip 31 in preparation for wrapping and storage.

Figure 9:
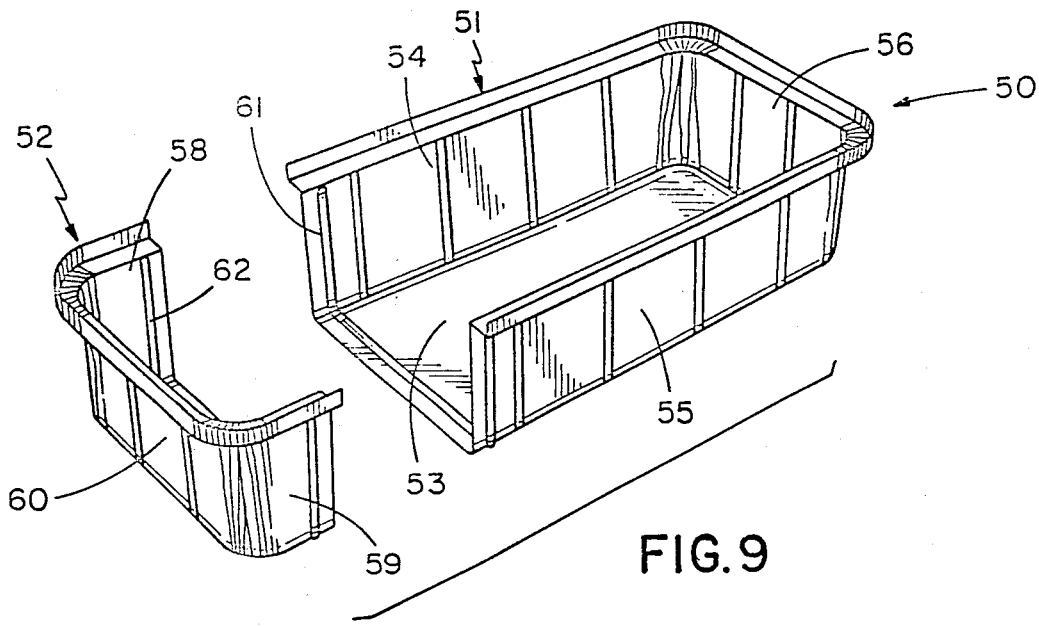
FIG. 9 is a perspective exploded view similar to FIG. 5 illustrating a modified form of the container illustrated in FIG. 8.
Figure 10:
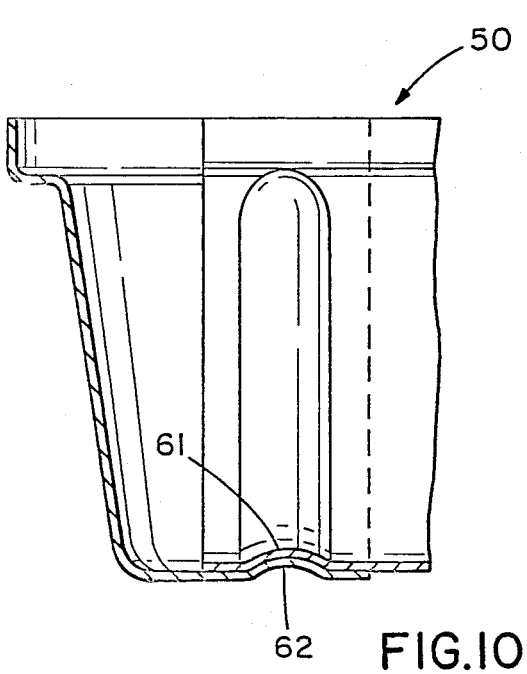
FIG. 10 is a fragmentary longitudinal view of the removable end of the container illustrated in FIG. 8.
Figure 11:
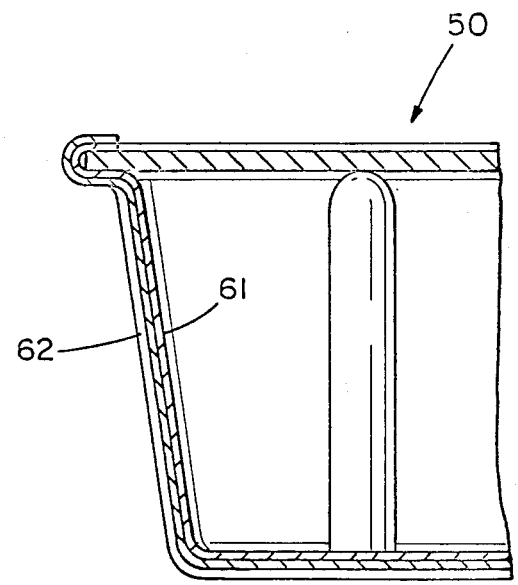
FIG. 11 is a fragmentary cross-section similar to FIG. 7 of the modified form of the present container illustrated in FIG. 8.

Another form of the present container is illustrated at 50 in FIGS. 8 to 11 and container 50 is seen to be substantially identical to container 10 illustrated in FIGS. 1 to 8 and generally includes a main container section 51 and an end container section 52. Container section 51 includes bottom wall 53, side walls 54 and 55 and end wall 56, while container section 52 includes side wall portions 58 and 59 and end wall portion 60. Container sections 51 and 52 are substantially identical to corresponding container sections 18 and 22 in FIGS. 1 to 8 embodiment except for the addition of a rib 61 in container section 51 and a complementary rib 62 in container section 58. As seen in FIGS. 10 and 11 the ribs 61 and 62 extend across the side walls and bottom wall of each section 51 and 52 and each have uniform wall thickness equal to the remaining portions of the sections and are arcuate in cross-section as seen clearly in FIG. 10 throughout their lengths. The ribs 61 and 62 firmly engage one another to provide additional structural strength for the container 50 and assist in holding the container sections 51 and 52 in position.

Figure 12:
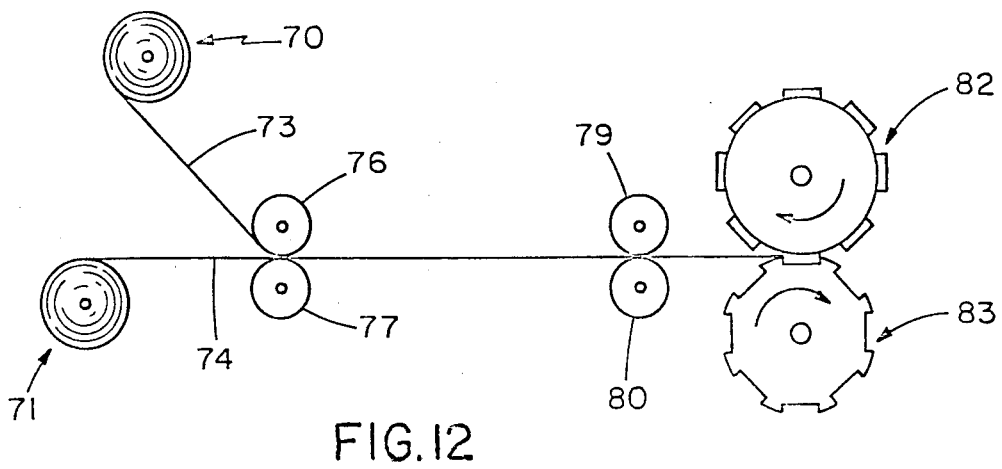
FIG. 12 is a schematic view of a continuous feed apparatus for manufacturing the present container and exemplifying a preferred method of manufacture thereof.

As seen in FIG. 12, an apparatus is provided for constructing either the container shown in FIGS. 1 to 8 or the one illustrated in FIGS. 9 to 11 and such apparatus generally includes a first web feeding device 70 and a second web feeding device 71 that feed thin walled aluminum webs 73 and 74 into engagement between press rollers 76 and 77. Webs 73 and 74 are laterally offset so that the webs overlap only at an area equal to area 36 in FIG. 6. One or both of the webs 73 and 74 are pre-glued with a suitable contact cement in selected areas so that only the bottom 11 carries adhesive so that when pressed together by rollers 76 and 77, they adhere to one another across area 36. Feed rollers 79 and 80 pass the composite web 73-74 to rotary draw-forming die cylinders 82 and 83 that carry respectively male and female drawing dies for forming the entire container 10 or 50 illustrated in FIGS. 4 and 8 respectively in the configuration shown in those views including side walls, cover shoulders and vertical wall lips.

After the bakery goods are inserted into the completed containers and baked, the cover panel 38 is placed on the supporting shoulders and the crimp of the upper lip is formed as shown in FIGS. 7 and 11 over the cover 38 with a suitable crimping tool.

I claim:

1. A thin-walled container for commercial food products constructed in two sections to facilitate removal of its contents, comprising: a first section constructed of a flexible sheet having a bottom wall and at least one side wall, a second section constructed of the same flexible sheet having a bottom wall and at least one side wall overlapping and engaging the bottom wall and side wall of the first section, said first and second sections having a wall thickness of less than 0.030 inches, said first and second sections being connected together without any separate fasteners, and a cover over the container, said side walls of the first and second sections having a lip crimped over the cover to strengthen the container and assist in holding the first and second sections together.

2. A thin-walled container for commercial food products constructed in two sections as defined in claim 1, including at least one rib formed in the first and second sections in the area where the first and second sections overlap to assist in holding the first and second sections together.

3. A thin-walled container for commercial products constructed in two sections as defined in claim 1, including a manually releasable adhesive holding the first and second sections together.

4. A thin-walled container for commercial food products constructed in two sections to facilitate removal of its contents, comprising: a first section constructed of a flexible sheet having a bottom wall and at least one side wall, and a second section constructed of the same flexible sheet having a bottom wall and at least one side wall overlapping and engaging the bottom wall and side wall of the first section, said first and second sections having a wall thickness of less than 0.030 inches, said first and second sections being connected together without any separate fasteners, said side walls of the first and second sections having coplanar shoulders formed at the upper portions thereof adapted to receive a cover and having coplanar vertical shoulders at the upper portions thereof adapted to be crimped over the cover.

5. A thin-walled container for commercial food products constructed in two sections to facilitate removal of its contents, comprising: a first section constructed of a flexible sheet having a bottom wall and at least one side wall, and a second section constructed of the same flexible sheet having a bottom wall and at least one side wall overlapping and engaging the bottom wall and side wall of the first section, said first and second sections having a wall thickness of less than 0.030 inches, said first and second sections being connected together with an adhesive without any separate fasteners, said side walls of the first and second sections having a lip crimped over one another.

* * * * *